United States Patent [19]
Maeda et al.

[11] Patent Number: 5,710,270
[45] Date of Patent: Jan. 20, 1998

[54] WATER-SOLUBLE POLYSACCHARIDE AND A PROCESS FOR PRODUCING THE SAME

[75] Inventors: Hirokazu Maeda; Hitoshi Furuta; Ryuji Yoshida; Taro Takahashi; Yoko Sato, all of Ibaraki; Masanori Hisakawa; Susumu Teranishi, both of Osaka, all of Japan

[73] Assignee: Fuji Oil Co., Ltd., Osaka, Japan

[21] Appl. No.: 647,558

[22] Filed: May 14, 1996

Related U.S. Application Data

[63] Continuation of Ser. No. 273,862, Jul. 12, 1994, abandoned.
[51] Int. Cl.$^6$ .............................. C07H 1/08; C07H 1/00; C08B 37/00
[52] U.S. Cl. .................. 536/124; 536/123; 536/123.1; 536/128
[58] Field of Search ..................... 536/123, 123.1, 536/124, 128

[56] References Cited

U.S. PATENT DOCUMENTS

| | | |
|---|---|---|
| 4,119,435 | 10/1978 | Nakao et al. |
| 4,971,810 | 11/1990 | Hoyda et al. |
| 5,342,641 | 8/1994 | Masutake et al. |
| 5,501,860 | 3/1996 | Maeda et al. ............... 424/464 |
| 5,587,197 | 12/1996 | Maeda et al. ............... 426/658 |

FOREIGN PATENT DOCUMENTS

| | | |
|---|---|---|
| 51091342 | 8/1978 | Japan . |
| 59-143554 | 8/1984 | Japan . |
| 1-62303 | 3/1989 | Japan . |
| 1-104144 | 4/1989 | Japan . |
| 2-303459 | 12/1990 | Japan . |
| 3-37904 | 6/1991 | Japan . |
| 3-236759 | 10/1991 | Japan . |
| 3-280858 | 12/1991 | Japan . |
| 3-290157 | 12/1991 | Japan . |
| 4-18401 | 1/1992 | Japan . |
| WO9005460 | 5/1990 | WIPO . |
| WO9111919 | 8/1991 | WIPO . |

OTHER PUBLICATIONS

"Polysaccharides of Soybean Seeds—Part I—Polysaccharide Constituents of 'Hot–Water–Extract' Fraction of Soybean Seeds and an Arabinogalactan as its Major Component," Morita, Makio, *Agr. Bio. Chem.* vol. 29, No. 6, pp. 564–573, 1965.

"Polysaccharides of Soybean Seeds—Part II—A Methylated Arabinogalactan Isolated from Methylated Product of 'Hot–Water–Extract' Fraction of Soybean Seed Polysaccharides," Morita, Makio, *Agr. Biol. Chem.*, vol. 29, No. 7, pp. 626–630, 1965.

"Polysaccharides of Soybean Seeds—Part III—1,4 Linked Galacto–di–and Trisaccharides from Partial Acid Hydrolysate of the 'Hot–Water–Extract' Fraction of Soybean Seed Polysaccharides," Morita, Makio, et al., *Agr. Biol. Chem.*, vol. 31, No. 3, pp. 314–318, 1967.

"Rheological Behavior of Soluble Polysaccharide Fractions from Soybeans," Thompson, D. B., et al., *Food Hydrocolloids*, vol. 1, No. 4, pp. 333–337, 1987.

"Non–Starch Polysaccharides of Seeds of Soybean," Ravindran, G., *J. Natn. Sci. Coun. Sri Lanka*, vol. 16, No. 2, pp. 223–228, 1988.

*Primary Examiner*—John Kight
*Assistant Examiner*—Everett White
*Attorney, Agent, or Firm*—Wallenstein & Wagner, Ltd.

[57] ABSTRACT

There is disclosed a water-soluble polysaccharide composed of rhamnose, fucose, arabinose, xylose, galactose, glucose and uronic acid, and a degree of esterification of uronic acid of not more than 50%. This water-soluble polysaccharide is useful as a protein stabilizer. A process for preparing the same and food containing the same is also disclosed.

5 Claims, No Drawings

5,710,270

1

WATER-SOLUBLE POLYSACCHARIDE AND A PROCESS FOR PRODUCING THE SAME

This is a Continuation of application Ser. No. 08/273,862 filed Jul. 12, 1994, now abandoned.

BACKGROUND OF THE INVENTION

1. Field of the Invention

The present invention relates to a water-soluble polysaccharide, more particularly, a water-soluble polysaccharide having stable protein particles when exposed to acid, and a process for producing such a polysaccharide.

2. Description of the Related Art

Polysaccharide is widely known, and a water-soluble polysaccharide has a very wide molecular weight range. However, if its molecular weight is too low, its ability to stabilize protein particles when exposed to acid is nullified, and if the molecular weight is too high, the viscosity becomes high, good palatability is not obtained and it is difficult to obtain a high concentration solution.

At the present time, pectin, guar gum, gum arabic, xanthan gum and the like are known as food stabilizers. Pectin is extracted from fruits, and guar gum is extracted from the cell wall of seeds of the acacias. Gum arabic is prepared by refining sap and xanthan gum is prepared by fermentation, but, there is no example of them being prepared from a husk or cell wall of cereals such as soybean.

On the other hand, a polysaccharide derived from a soybean husk, its alkaline decomposition product and its enzymatic decomposition product are known. For example, in JP-A 3-236759, water-soluble polysaccharides are obtained by thermally hydrolyzing a water-insoluble fiber under acidic conditions. However, stability for protein particle dispersion of these polysaccharides is not enough.

And pectin is utilized in a food or a beverage containing milk protein such as yoghurt, pectin is utilized as a stabilizer for milk protein under acid conditions. However, due to its high viscosity, it is glutinous, and it does not have a pleasant taste.

SUMMARY OF THE INVENTION

As described above, polysaccharides having a low viscosity that function to stabilize protein particles under acidic conditions were not previously obtained, and a polysaccharide such as pectin, which has a known protein stabilizing effect, has high viscosity and a glutinous taste. Based on these problems, the object of the present invention is to provide a polysaccharide having low viscosity that is capable of stabilizing protein particles under acidic conditions.

The inventors have strived to obtain a polysaccharide having low viscosity and the capability to stabilize protein particles under acidic conditions, and found that water-soluble polysaccharides obtained by demethoxylation of water-soluble hemicellulose satisfy the above.

These and other objects, features and advantages of the present invention will become more apparent from the detailed description and examples given below.

DESCRIPTION OF THE PREFERRED EMBODIMENTS

One aspect of the present invention is a water-soluble polysaccharide wherein its constituent sugar components are rhamnose, fucose, arabinose, xylose, galactose, glucose and uronic acid, and the degree of esterification of uronic acid is not more than 50%.

A second aspect of the present invention is a process for preparing such a polysaccharide characterized in that water-soluble hemicellulose is demethoxylated.

The raw materials utilized in the present invention can be any vegetable, however, unlike pectin, which is extracted from fruit, as a raw material from which hemicellulose having a low galacturonic acidic content is extracted, a husk or cell wall derived from cereals such as soybean is preferable as there is a stable supply. As the source of hemicellulose containing uronic acid, which is a sugar having a carboxyl group that promotes stability, beans such as soybeans are preferable.

Further, among beans, soybeans are preferable as a raw material because soybean is a raw-material of tofu (soybean curd) and soybean isolate, okara (soybean curd refuse), which is prepared when producing tofu as a byproduct, has been deproteinized and has defatted, husk and cell walls, which are sources of water-soluble hemicellulose, are purified to a certain degree.

A process for producing a water-soluble polysaccharide of the present invention is described below. In the process, the most important feature is that methylated carboxyl group of uronic acid, which is a constituent sugar component of water-soluble hemicellulose, is demethoxylated. For demethoxylation, an acid, alkali, or enzyme can be used, and it is preferable to use an acid or an alkali because it is inexpensive and simple. Alkali is most preferable because of the efficiency. Demethoxylation can be conducted during extraction of a water-soluble hemicellulose, but it is preferable to perform the demethoxylation before or after said extraction.

If demethoxylation is effected before extraction of a water-soluble hemicellulose, at first, a raw material is demethoxylated as follows. To the raw material, sufficient water is added and stirred. The amount of water depends on the water content contained in the raw material, 1–8 fold amount is suitable. The pH of this suspension is adjusted to 9–14, preferably 11–13 by alkali. An example of alkali comprises sodium hydroxide, potassium hydroxide, calcium hydroxide, ammonia water and the like. A stabilizing effect of this treatment is more efficient at a high pH level than at a low pH level. However, the lower the pH level, the higher the coloring. After a pH adjustment is made, the suspension is heated above room temperature, preferably above 50° C. The higher the temperature the greater the effect, however, the coloring is deeper when the temperature is higher.

Next, solid-liquid separation is effected by centrifugation, or press filtration and this separation process can be performed under the alkali conditions as stated above, or protein eluted from raw material by alkali can be recovered by isoelectric precipitation. The latter case is preferable because organic materials present in the liquid phase is low, and the problem involving wastewater treatment is minimized. Unlike a known method involving purification of a polysaccharide by deproteinization carried out at room temperature, in the present process, the presence of protein in solid phase is not critical.

Then water-soluble hemicellulose is extracted from the solid obtained above. A water-soluble hemicellulose can be extracted at any pH range, i.e., alkali, neutral, or acid condition. It is preferable to extract at the isoelectric point of the protein contained in this solid because it is efficient and pure. For example, when using okara, the extraction is conducted at a pH of 2–7, preferably at 3–6, more preferably at 4–5.5. The temperature during-said extraction should be above room temperature, preferably above 80° C., more preferably 100°–130° C. Optionally, water can be added to promote the extraction and stirring efficiency at this heat extraction step.

After extraction, a water-soluble fraction and a water-insoluble fraction are separated by centrifugation or press filtration. The separated water-soluble fraction contains water-soluble hemicellulose. This solution is decolored, deodorized, demineralized, and dried to obtain a water-soluble polysaccharide of the present invention. The stabilizing effect of the water-soluble soluble polysaccharide of the present invention is similar to that obtained without decoloring, deodorizing, and demineralizing steps.

If demethoxylation is effected after extraction of water-soluble hemicellulose, at first, hemicellulose is extracted, and the sufficient water is added and stirred to the raw material. The amount of water depends on the water content contained in the raw material. 1–5 fold amount is suitable. Preferably, the extraction of hemicellulose is effected at the isoelectric point of the protein contained in the raw material similar to the extraction process above. And the temperature of this extraction is above room temperature, preferably above 80° C. and particularly 100°–130° C.

After extraction, the water-soluble fraction and the water-insoluble fraction are separated by centrifugation or press filtration to obtain a solution containing water-soluble hemicellulose as described above, and the water-soluble hemicellulose is then demethoxylated. This step is conducted as follows. At first, the pH of a solution containing water-soluble hemicellulose is adjusted to 9–14, preferably 11–13 by use of alkali. After adjusting the pH, the solution is heated above room temperature, preferably above 40° C. The higher the temperature and the higher the pH, the greater the effect and the coloring.

After demethoxylation, this solution is dried to obtain a water-soluble polysaccharide of the present invention.

The obtained water-soluble polysaccharide of the present invention contains, as its constituent sugar component, rhamnose, fucose, arabinose, xylose, galactose, glucose and uronic acid and optionally mannose and fructose. The composition is usually 1–7 wt % of rhamnose, 2–8 wt % of fucose, 15–50 wt % of arabinose, 2–10 wt % of xylose, 25–60 wt % of galactose, not more than 4 wt % of glucose and 10–35 wt % of uronic acid, methyl ester of uronic acid is demethoxylated, and its degree of esterification is not more than 50%, preferably not more than 30%, particularly not more than 20%. The water-soluble polysaccharide containing this composition is suited for stabilization of protein particles.

The water-soluble polysaccharide of the present invention is fractionalized by gel filtration chromatography (G500, TOSOH Corp., eluate: 0.1M phosphate buffer, pH 6.8) to obtain A, B, and C fraction depending on the molecular weight. A fraction has a high, molecular weight, and has an excellent stabilizing effect of protein particles under acidic conditions. B and C fraction have relatively low molecular weights, and insufficient stabilizing effect of protein particles, but they contribute to reducing viscosity and may be contained in a small amount.

The water-soluble polysaccharide of the present invention exhibits an excellent stabilizing effect of protein particles and has low viscosity by being constituted with this A, B, and C fractions. The average molecular weight of A, B, and C fractions measured using the following method (B method) are from hundreds of thousands to millions, tens of thousands, and thousands respectively. Sugar composition of A and B fractions consists of uronic acid, rhamnose, fucose, arabinose, xylose, galactose, and glucose. Especially, A fraction contains mainly uronic acid. C fraction has a low molecular weight fraction consisting mainly of low molecular sugar and protein.

The greater the weight proportion of A fraction relative to B and C fraction the better the stabilizing effect of protein particles under acidic conditions.

The average molecular weight of a water-soluble polysaccharide of the present invention is from tens of thousands to millions, preferably from 50,000 to 1,000,000 by A method described below, and methyl ester of uronic acid contained should be demethoxylated, its degree of esterification should be not more than 50%, preferably not more than 30%, and most preferably not more than 20%.

In the present invention, the proportion of polysaccharide is determined by the following analytical methods.

Uronic acid is determined by the Blumenkrantz method. And Neutral saccharide is determined by the alditol-acetate method.

The average molecular weight of polysaccharide is determined by the following methods.

A method

Standard pullulan (manufactured by Syowa Denko K.K.) is used as a standard substance to measure the viscosity in 0.1M sodium nitrate according to intrinsic viscosity to determine the molecular weight.

B method

Standard pullulan (manufactured by Syowa Denko K.K.) is used as standard substance to prepare a standard curve of retention time of HPLC gel filtration chromatgraphy (Tosoh-G500 OPWLX, eluate: 0.1M phosphate buffer, pH 6.8) and to determine the molecular weight from retention time of a sample from this standard curve.

A specific rotation (25° C.) of polysaccharide of the present invention is not less than 15, preferably from 20 to 70.

The protein content of the polysaccharide of the present invention is not more than 13 wt %, preferably not more than 9 wt %.

The ash content of the polysaccharide of the present invention is from 1 to 12 wt %, preferably from 2 to 8 wt %, and because of the presence of ash, water solubility is increased.

The invention will be understood more readily with reference to the following examples; these examples are intended to illustrate the invention and do not to limit the scope thereof.

Preparation of Water-Soluble Polysaccharide

EXAMPLE 1

To okara obtained during the preparation of soybean isolate, an amount of water was added, and sodium hydroxide was added to this suspension to adjust the pH to 12. The suspension was then heated to 60° C. for 1 hour, and thereafter centrifuged (5000 G, 10 min) to separate the supernatant and the alkali treated okara.

To this okara, an equal volume of water was added, and the pH was adjusted to 5 using hydrochloric acid, and the suspension was heated to 120° C. for 1 hour in an autoclave to extract water-soluble hemicellulose. After extraction, the suspension was centrifuged (5000 G, 10 min) to separate the water-soluble fraction containing mainly water-soluble hemicellulose. The water-soluble fraction was dried by a spraydryer to obtain water-soluble polysaccharide (1).

EXAMPLE 2

To okara obtained during the preparation of soybean isolate, an amount of water was added, sodium hydroxide was added to this suspension to adjust the pH to 12. To this suspension, hydrochloric acid was added to adjust the pH to 5. The mixture was then centrifuged (5000 G, 10 min) to separate the supernatant and the alkali treated okara.

This okara, to which solubilized protein was resettled, contains most of okara's protein. To this okara, an equal volume of water was added, and heated to 120° C. for 1 hour in an autoclave to extract water-soluble hemicellulose. After extraction, this suspension was centrifuged (5000 G, 10 min) to separate the water-soluble fraction containing mainly water-soluble hemicellulose, and the water-soluble fraction wad dried by a spraydryer to obtain a water-soluble polysaccharide (2).

EXAMPLE 3

To okara obtained during the preparation of soybean isolate, an amount of water was added, and hydrochloric acid was added to this suspension to adjust the pH to 5. The suspension was then heated to 120° C. for 1 hour in an autoclave, and thereafter centrifuged (5000 G, 10 min) to separate a water-soluble fraction containing mainly water-soluble hemicellulose.

To this solution containing water-soluble hemicellulose, sodium hydroxide was added to adjust the pH to 12. The mixture was then heated to 90° C. for 30 min. The generated precipitate was removed, and hydrochloric acid was added to neutralized the precipitate to adjust the pH to 7. The solution was then dried to obtain water-soluble polysaccharide (3).

EXAMPLE 4

By using okara, which is a byproduct of tofu preparation, water-soluble polysaccharide (4) was obtained using a method similar to that of Example 1.

EXAMPLE 5

To the okara obtained during the preparation of soybean isolate, an amount of water was added, and hydrochloric acid was then added to the suspension to adjust the pH to 5. The suspension was then heated to 120° C. for 1 hour in an autoclave, and thereafter centrifuged (5000 G, 10 min) to separate the water-soluble fraction containing mainly water-soluble hemicellulose. The solution was then dried to obtain water-soluble polysaccharide (5).

EXAMPLE 6

To okara obtained during the preparation of a soybean isolate, an amount of water was added, and sodium hydroxide was added to this suspension to adjust the pH to 12. The suspension was then stirred without heating, and thereafter centrifuged (5000 G, 10 min) to separate the supernatant and the alkali treated okara.

To this okara, an equal volume of water was added, and the pH was adjusted to 5 using hydrochloric acid. The suspension was then heated to 120° C. for 1 hour in an autoclave to extract water-soluble hemicellulose, and after extraction, the suspension was centrifuged (5000 G 10 min) to separate the water-soluble fraction containing mainly water-soluble hemicellulose. The water-soluble fraction was then dried by a spraydryer to obtain water-soluble polysaccharide (6).

The sample of water-soluble polysaccharides (1)–(3), (5) and (6) are prepared in a 10% solution (pH 7), and its infrared spectrum is measured by a spectrometer FT-300 (Horiba Seisakusho). The transmittance thereof is shown in Table 1.

TABLE 1

| Transmittance of infrared spectrum (%) | | | | |
|---|---|---|---|---|
| | frequency (cm$^{-1}$) | | | |
| sample | 1740 | 1594 | 1415 | 1240 |
| polysaccharide (1) | 100.3 | 92.9 | 87.8 | 94.3 |
| (2) | 99.6 | 92.8 | 87.9 | 92.6 |
| (3) | 98.7 | 93.1 | 88.0 | 93.6 |
| (4) | 98.9 | 93.2 | 88.1 | 93.5 |
| (5) | 96.6 | 95.9 | 89.3 | 90.0 |
| (6) | 97.7 | 94.6 | 89.5 | 90.3 |

Comparing the water-soluble polysaccharide (1)–(3) obtained using a process of the present invention with water-soluble polysaccharide (5) and (6) obtained by heat extraction without an alkali treatment or heat extraction after an alkali treatment at room temperature, absorbance at 1240, 1420, 1600 and 1740 cm$^{-1}$ are different. That is, in polysaccharide (5) obtained without an alkali treatment and polysaccharide (6) obtained using an alkali treatment at room temperature, absorbance at 1240 and 1740 cm$^{-1}$ is high, which indicates the presence of methyl ester. While in polysaccharides (1)–(3) obtained using process of the present invention, absorbance is not detected. Conversely absorbance at 1420 and 1600 cm$^{-1}$ is considered carboxylic group absorbance, and (1)–(3) are higher than that of (5) and (6). These results suggest that the methyl esterificated carboxylic group of uronic acid is demethoxylated by an alkali treatment when heated.

Composition and sugar composition of water-soluble polysaccharide (1), (2) and (5) were measured, and the results are shown in Table 2 and Table 3.

TABLE 2

| component | (1) | (2) | (5) |
|---|---|---|---|
| water | 4.4 | 3.6 | 5.1 |
| protein | 2.4 | 7.4 | 5.4 |
| ash | 6.4 | 9.3 | 5.3 |
| polysaccharides | 86.8 | 79.7 | 84.2 |
| specific rotation (25° C.) | +39.9 | +27.3 | +37.4 |

TABLE 3

| sugar | (1) | (2) | (5) |
|---|---|---|---|
| uronic acid | 20.1 | 18.7 | 19.4 |
| rhamnose | 4.1 | 4.4 | 2.1 |
| fucose | 3.5 | 3.7 | 3.9 |
| arabinose | 21.6 | 21.9 | 23.1 |
| xylose | 4.3 | 4.0 | 5.8 |
| galactose | 45.2 | 47.1 | 43.4 |
| glucose | 1.2 | 1.2 | 2.3 |
| degree of esterification of uronic acid | 14.5 | 18.9 | 63.6 |

These results indicate that the methyl esterificated carboxylic group of uronic acid is demethoxylated by an alkali treatment when heated.

The degree of esterification is determined using a method for measuring the degree of esterification of pectin. Namely, using a sample before and after demethoxylation by alkali, the data was obtained from the following equation.

Degree of Esterification $(DE)=V_2/(V_1+V_2)\times100$ wherein $V_1$ represents amount of 0.1N NaOH (ml) when the uronic acid sample is made free by using isopropyl alcohol containing hydrochloric acid, and washed by isopropyl alcohol to prepare a sample not containing hydrochloric acid, and this sample is titrated by NaOH using phenolphthalein as an indicator; $V_2$ represents amount of 0.1N NaOH (ml) when 0.5N NaOH is added to the above titrated sample solution, then, an amount of HCl in the same volume as that of NaOH used in demethoxylation is added, and this sample is titrated in the same way as $V_1$.

Effect on Protein Particles Stabilization

Acid milk beverages are prepared using water-soluble polysaccharide (1)–(6) and pectin used as a protein stabilizer for acid milk beverage presently. And the condition and viscosity of the acid milk beverage are measured after 7 days of preparation.

Acid milk beverages were prepared according to the following method.

(i) Preparation of yogurt
    Skim milk was added to water (21%), heated and stirred, and sterilized at 95° C. After cooling, as a starter, commercially available plain yogurt was injected into the mixture, and fermented in a thermostatic chamber at 38° C. After grinding the fermented yogurt to homogenize the curd, the mixture was cooled to 10°–15° C.

(ii) Preparation of stabilizer solution
    2% solution of water-soluble polysaccharide was heated while stirring (80° C., 10 min), and cooled to 25° C.

(iii) Preparation of acid milk beverage
    Sugar was added to the water to prepare a sugar solution. Into this solution, a stabilizer solution and yogurt were added, and the pH of this mixture was adjusted by the addition of lactic acid and sodium citrate. This mixture was then homogenized by a homogenizer (150 kg/cm²), bottled, and stored in a refrigerator for one week. The percentage of the components were 20% stabilizer solution, 40% yogurt, 7% sugar, and 33% water. The results are shown in Table 4.

TABLE 4

| stabilizer | pH of acid milk beverage | condition after 7 days | viscosity of after 7 days (cps) |
|---|---|---|---|
| (1) | 4.5 | stabilized | 11 |
|  | 4.2 | stabilized | 10 |
|  | 4.0 | stabilized | 10 |
| (2) | 4.5 | stabilized | 12 |
|  | 4.2 | stabilized | 10 |
|  | 4.0 | stabilized | 11 |
| (3) | 4.5 | stabilized | 12 |

TABLE 4-continued

| stabilizer | pH of acid milk beverage | condition after 7 days | viscosity of after 7 days (cps) |
|---|---|---|---|
|  | 4.2 | stabilized | 11 |
|  | 4.0 | stabilized | 11 |
| (4) | 4.5 | agglutinated | 82 |
|  | 4.2 | stabilized | 11 |
|  | 4.0 | stabilized | 11 |
| (5) | 4.5 | agglutinated | 100 |
|  | 4.2 | agglutinated | 75 |
|  | 4.0 | agglutinated | 20 |
| (6) | 4.5 | agglutinated | 120 |
|  | 4.2 | agglutinated | 80 |
|  | 4.0 | agglutinated | 15 |
| pectin | 4.5 | stabilized | 30 |
|  | 4.2 | stabilized | 26 |
|  | 4.0 | stabilized | 26 | milk beverage is stabilized in the range above pH 4.0 using water-soluble polysaccharide of the present invention, and the acid milk beverage containing water-soluble polysaccharide of the present invention has low viscosity and a good taste.

Although the preferred form of the present invention has been described, it is understood that modifications will be apparent to those skilled in the art, without departing from the spirit of the invention, and thus the scope of the invention is to be determined solely by the following claims.

We claim:

1. A process for preparing a water-soluble polysaccharide wherein its constituent sugar components are rhamnose, fucose, arabinose, xylose, galactose, glucose and uronic acid, and having a degree of esterification of uronic acid not more than 50%, comprising demethoxylation of a methylated carboxyl group of uronic acid before or after extraction of a water-soluble hemicellulose, and in which process, said demethoxylation step comprises heating a raw material containing a water-soluble hemicellulose at a temperature of from 40° to 90° C. at a pH of from 9 to 14, and said extraction step comprises heat extracting a raw material containing a water-soluble hemicellulose at a temperature of from 80° to 130° C. at a pH of from 3 to 6 and separating a water-soluble fraction.

2. A process according to claim 1, wherein the raw material from which the water-soluble hemicellulose is extracted is vegetable.

3. A process according to claim 2, wherein the vegetable is a cereal.

4. A process according to claim 2, wherein the vegetable is a soybean.

5. A process according to claim 1, wherein a pH of from 9 to 14 is effected by adding an alkali including sodium hydroxide, potassium hydroxide, calcium hydroxide or ammonia water.

\* \* \* \* \*